Jan. 30, 1940.

J. A. CASTRICONE 2,188,807

RESILIENT MOTOR MOUNTING

Filed Aug. 21, 1937

Inventor:
John A. Castricone
By Tefft & Tefft
Atty.

Patented Jan. 30, 1940

2,188,807

UNITED STATES PATENT OFFICE 2,188,807

RESILIENT MOTOR MOUNTING

John A. Castricone, Peoria, Ill., assignor to Altorfer Brothers Company, Peoria, Ill., a corporation of Illinois Application August 21, 1937, Serial No. 160,273

3 Claims. (Cl. 248—18)

This invention relates to motor mountings and, more particularly, to a mounting for electric and other motors and adapted to absorb vibrations due to various causes such as torque fluctuations, unbalanced mechanical and electrical conditions and so forth. The invention will be exemplified in connection with an electric motor arranged to drive an electric ironing machine but application of the invention to other machines will be obvious.

Where, in machines such as electric ironers, the housing for the mechanism includes panels or the like composed of one or more sheets of metal or other composition and where the motor is mounted directly upon the machine housing or frame, any unevenness of operation of the motor may be transmitted to the frame or housing and the panels or other parts which may vibrate in turn within or without the audible range. Whether the vibration of the machine is audible or not, it is usually objectionable to the operator. Where the vibration arises in such manner as to tend to pass through the rotor of the motor to the machine parts, it may be controlled and absorbed to a very large extent by the provision of a resilient coupling or the like between the motor shaft and the driven mechanism but this does not solve the problem of damping or absorbing vibrations transmitted or tended to be transmitted through the motor casing or stator to the machine.

It is, therefore, one of the primary objects of the invention to provide a motor mounting of such character that all of the vibrations which might arise within the motor will be damped or absorbed before reaching the machine upon which the motor is mounted. In this connection it may be noted that vibrations arising within the machine are damped or absorbed before reaching the motor.

Another object is to provide a mounting, of the character described, of economical construction yet one which will be sturdy and efficient in operation.

Further objects as well as the advantages and uses of the invention will become apparent and will be understood after reading the following description and claims and after viewing the drawing in which:

Figures 1, 2:
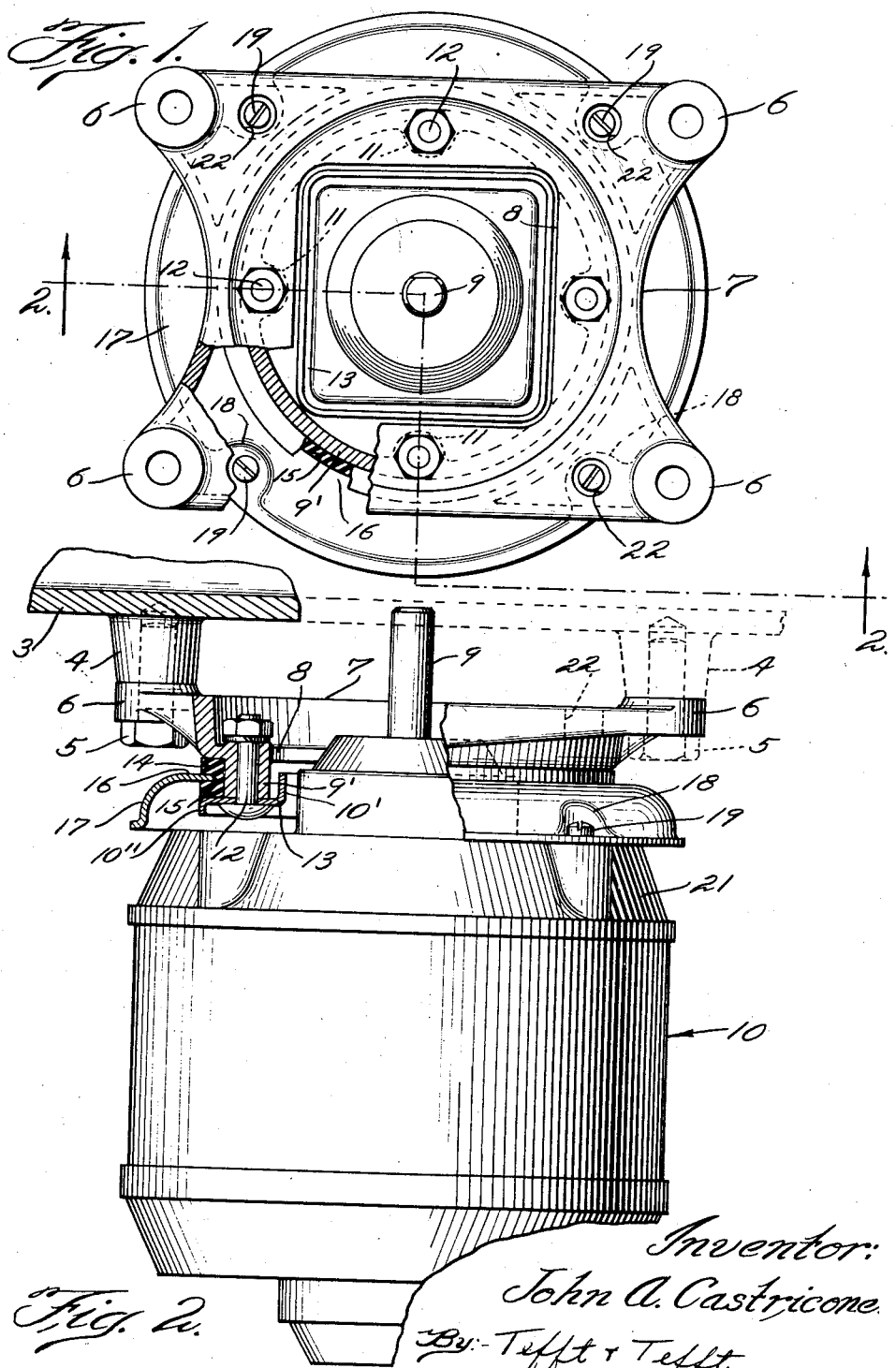
Fig. 1 is a top plan view of a motor mount or support constructed in accordance with a preferred form of the invention, parts being broken away to show other parts in section, and an electric motor being shown below the support.
Fig. 2 is an elevational view of the motor and its mount shown in Fig. 1, certain parts being broken away and certain other parts being in section to show the construction, the view of the support being taken substantially along the line 2—2 of Fig. 1.

A portion of the gear housing of an ironing machine is shown at 3 and is illustrated as including bosses 4 of which there may be four. The bosses 4 are drilled and tapped to receive machine bolts or machine screws 5 which pass through suitable apertures in bosses 6 of a mounting base member or plate 7 and secure the base member or plate to the bottom of the ironing machine gear case housing. The base member or plate 7 may be made in any suitable form in plan but is provided with a central aperture 8, shown as square in this embodiment, through which the motor shaft 9 of a motor, generally designated 10, may pass.

Surrounding the opening 8 is a depending circular flange 9' which at suitably spaced places is enlarged or thickened as at 11 and thereat drilled for the reception of bolts 12 which pass therethrough and serve to secure a stamped metal retaining member 13 generally of annulus or ring-shape thereto. The retaining member 13 has a central opening conforming in shape (in this case) to the opening 8 and the opening is bounded by an upwardly extending flange 10' while at its outer periphery the member 13 has a circumferentially depending flange 10". The flanges 10' and 10" lend strength to the member 13 and aid in centering the member with respect to other parts. Member 13 together with the circumferential depending flange 9, form an outwardly opening circular groove or recess within which a rubber or rubber composition or other resilient material ring 14 is disposed. The resilient ring 14 may be tensioned to some slight degree and cemented in the recess or it may be disposed in the recess without cementing it therein. However, it has been found preferable to make the internal diameter of the ring slightly greater than the diameter of the recess at its bottom and thereafter to place the ring under compression rather than under tension within the recess with or without cementing.

The resilient ring 14 is, in turn, circumferentially grooved or slotted as shown at 15 for the reception of the inner perimeter portion 16 of a bell-shaped stamping or the like 17 of ring or annulus shape in plan and which at its outer perimeter portion is indented at suitably spaced places 18 for the reception of the heads or cap screws 19 which pass through suitable apertures in the member 17 and into the end bell 21 of the housing of the stator of the motor 10 and through the stator into the opposite bell of the stator housing.

The assembly of the mount is relatively simple and therefore will be described very briefly. The rubber or other resilient ring 14 is assembled with the supporting member or annulus 17 with the perimeter 16 of the latter disposed in the groove 15 of the former. The fit may be such as tightly to clamp the rubber upon the perimeter 16 but it may be preferable also to cement these parts together. Thereafter the ring 14 is placed about the flange 9 and the retainer ring 13 is put in place and secured by bolts 12. For the purpose of attaching the support or mount assembly to the motor by cap screws 19 which are quite long, the base member 7 may be provided with holes 22 which may be drilled or otherwise formed and through which the cap screws may be passed and secured in place. Thereafter the motor and mount may be secured by bolts 5 to the machine part 3.

Inasmuch as the cap screws 19 pass through the end bells of the motor and through the stator to hold these parts in assembled relation, and inasmuch as they are centered equidistant from one another and from the axis of motor shaft 9, their engagement with the bell-shaped supporting member 17 will center the motor shaft with respect to the circular perimeter 16 and therefore with respect to the resilient ring 14 and the base member 7. The shaft 9, on the other hand, will normally be connected with the driven mechanism through a resilient coupling member or the like. Consequently, fluctuations in torque or any unbalanced condition of a mechanical or electrical nature, tending to set up vibrations in the motor housing or stator will in no wise affect vibration of the base 7 or the machine frame or housing 3. The resilient or other material ring 14 absorbs or damps out the vibrations and leaves no metal to metal contact between the motor and the machine upon which it is mounted. The motor stator is free, within limits, to seek a rotated position or a position in any other direction under varying operating conditions although the supporting member 17 is held against movement relative to the rubber ring 14 within the groove 15 and although the resilient ring 14 is held tightly against movement relative to the retaining ring 13 and the base member 7, the resilience of ring 14 being sufficient to permit this action.

While I have illustrated and described what is at present a preferred embodiment of the invention, I have done so merely for illustrative purposes and therefore do not desire to be limited except by the spirit of the invention and the scope of the appended claims.

I claim:

1. A motor mounting for suspending an electric motor with its drive shaft disposed vertically; a base member having outwardly extending bolting lugs, a circular right angle flange extending inwardly and downwardly from said lugs, and bolting bosses inside said flange extending downward the full length thereof; a rubber ring with an outwardly opening recess adapted to fit over said circular flange; a clamped support member adapted to clamp the rubber ring in the right angle flange of the base member by bolts through said inside bolt bosses; and an annular motor support member adapted to be bolted to the motor on its outer periphery and clamped by its inner periphery in the rubber ring recess, the last named connection being the only connection between the motor and its support.

2. A motor mounting for suspending an electric motor with its drive shaft disposed vertically; a base member having outwardly extending bolting lugs, a circular right angle flange extending inwardly and downwardly from said lugs, and bolting bosses inside said flange; a rubber ring with an outwardly opening recess adapted to fit over said circular flange; a clamped support member adapted to clamp the rubber ring in the right angle flange of the base member by bolts through said inside bolt bosses; and an annular motor support member adapted to be bolted to the motor on its outer periphery and clamped by its inner periphery in the rubber ring recess, the last named connection being the only connection between the motor and its support.

3. A motor mounting for suspending an electric motor with its drive shaft disposed vertically; a base member having outwardly extending bolt supporting lugs and an inwardly projecting flange with bolting bosses therein; a circular right angle flange; a rubber ring with an outwardly opening recess adapted to fit over said circular flange; a clamp support member adapted to clamp the rubber ring in the right angle flange; and an annular motor support member adapted to be bolted to the motor on its outer periphery and clamped by its inner periphery in the rubber ring recess, the last named connection being the only connection between the motor and its support.

JOHN A. CASTRICONE.